Feb. 23, 1926.
A. L. ADATTE
1,574,591
MULTIPLE FILM GUIDE MOUNTING
Filed May 6, 1925
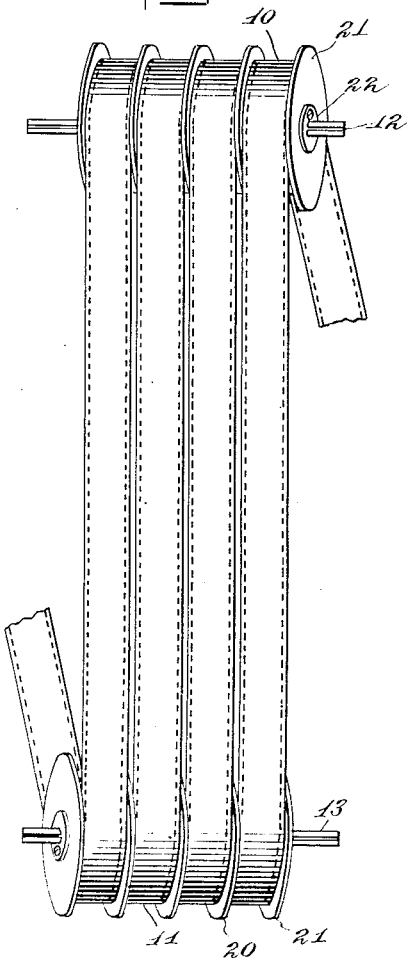
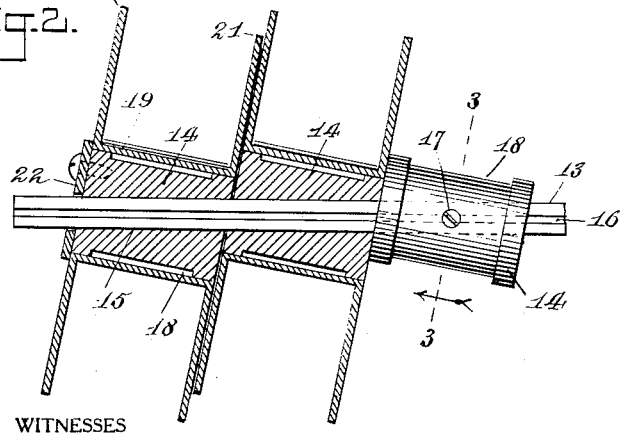
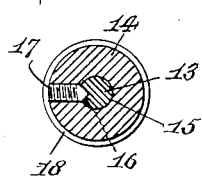
WITNESSES
INVENTOR
Albert L. Adatte.
BY
ATTORNEYS Patented Feb. 23, 1926.

1,574,591

UNITED STATES PATENT OFFICE.

ALBERT L. ADATTE, OF NORTH PLAINFIELD, NEW JERSEY, ASSIGNOR TO PATHE EXCHANGE, INC., OF JERSEY CITY, NEW JERSEY, A CORPORATION OF NEW YORK.

MULTIPLE-FILM-GUIDE MOUNTING.

Application filed May 6, 1925. Serial No. 28,445.

*To all whom it may concern:*

Be it known that I, ALBERT L. ADATTE, a citizen of Switzerland, and a resident of North Plainfield, in the county of Somerset and State of New Jersey, have invented a new and Improved Multiple-Film-Guide Mounting, of which the following is a full, clear, and exact description.

This invention relates to a new and improved film guide. An object of the invention is to provide a simple and efficient film guide, especially those which are adapted to receive and move a film which is being dried or developed.

Another object concerns a simple and efficient film guide adapted to receive a film and to be used in connection with other similar guides for the progressive advancing of a continuous strip of film in a spiral manner from one guide to another without permitting the film to bind or unduly wear or rub against the surfaces of the guide, especially the flanged surfaces thereof.

The invention is illustrated in the drawings, of which—

Figure 1 is an elevation of a plurality of guides shown in their co-operative relation to support a progressively advancing reel or film as it is being either dried or developed;

Fig. 2 is a horizontal section through a plurality of the guides; and

Fig. 3 is a section on the line 3—3 of Fig. 2.

The form of the invention shown in the drawings is a preferred form although it is understood that modifications in the construction and arrangement of the parts and in the character of the materials used may be adopted without departing from the spirit of the invention as set forth in the appended claims.

In its general aspect the main idea of the invention is to provide a multiple film guide which will continuously move a length of film to be moved over a series of guides, preferably flanged pulleys, in a spiral manner and effect this movement without having the edges of the film bind or wear on the flanges of the guide. I found that this could be done if the guides had their axes disposed at an angle to each other, that is to say, if the guides in one group were axially disposed with respect to the guides in another group. In this way the film is advanced from one guide to another without any binding or wearing action on the edges of the film. To effect this disposition of the guides, I have developed the particular guide mounting hereinafter described. It comprises, preferably, a fixed shaft on which is mounted a fixed hub having a bore to permit it to be slid on the shaft. The bore in this hub is disposed in a direction diagonal to the axis of the hub and suitable means is provided for fastening the hub to the shaft. Therefore, this hub, which acts as a bearing or journal for the guide frame, is inclined at an angle to the shaft and the guide as it rubs on the hub will ride on the axis at an angle to the shaft, and this is the movement which is desired. The angular relation of the bore in the hub to the axis of the hub is determined with regard to the angle at which it is desired to rotate the guide.

In the preferred form of the invention shown in the drawings, I illustrate in Fig. 1 a plurality of guides, such as 10 in one group and 11 in another group, mounted for rotation on shafts 12 and 13. These shafts are preferably parallel but the guides on one shaft are disposed at an angle to the shaft, and the guides on the other shaft are disposed at an angle to that second shaft, this angle being predetermined with regard to the movement of the film. The film, therefore, can be moved back and forth between the guides and advanced progressively therealong without binding or wear.

As shown in Figs. 2 and 3, on the shaft 13, for instance, I slip a hub 14, preferably provided with a bore 15, disposed at an angle to the axis of the hub. This shaft in one form is preferably provided with a longitudinal groove 16 to receive the end of a set screw 17 projecting into the groove from the hub 14 whereby the hub can be fixed in any desired longitudinal position on the shaft. The hub is preferably provided with a peripheral, central recess 18 which causes the production of two flanges on the ends of the hub, and on these flanges the guide frame 19 is adapted to ride, this guide frame having flanges 20 and 21.

As shown in Fig. 2, a plurality of hubs such as 14 are mounted on a shaft and disposed beside each other. Each hub is adapted to rotatably support a guide frame.

Preferably the end hubs are provided with end plates such as 22 to be slipped over the shaft 13 and bear against the hubs, these plates being of slightly larger diameter than the hubs to restrain the guide frames thereon. In this manner it will be apparent that I can mount a plurality of guides for rotation on a shaft to permit the simultaneous rotation of these guides at an angle to the shaft. By making the shafts 12 and 13 parallel, which is the preferred relation to be established, and by predetermining the axial angle of the guides with regard to their respective shafts, a film passing from guide to guide in a progressive spiral will proceed without binding or wear on the flanges 20 and 21 of each guide.

What I claim is:—

1. A film guide mounting, comprising a shaft and a hub slidably and non-rotatably mounted thereon, the bore of the hub being disposed longitudinally in a diagonal direction with regard to the axis of the hub, said hub adapted to rotatably support a film guide.

2. A film guide mounting, which comprises a shaft, a plurality of hubs slidably and non-rotatably mounted side by side on the shaft, means for clamping each hub to the shaft, each hub being provided with a bore disposed longitudinally in a diagonal direction with regard to the axis of each hub, and a film guide mounted for rotation on each of the hubs.

3. A film guide mounting, which comprises a shaft having a longitudinal groove, a hub slidably and non-rotatably mounted on said shaft, a set screw in the hub projecting into said groove, each hub being provided with a bore disposed longitudinally in a diagonal direction with regard to the axis of the hub and permitting the rotation thereon of a film guide in a direction diagonal to the axis of the shaft.

ALBERT L. ADATTE.